US007566512B2

(12) United States Patent
Bednarz et al.

(10) Patent No.: US 7,566,512 B2
(45) Date of Patent: Jul. 28, 2009

(54) MOLTEN CARBONATE FUEL CELL AND METHOD FOR PRODUCTION THEREOF

(75) Inventors: Marc Bednarz, Ottobrunn (DE); Marc Steinfort, Aidlingen (DE)

(73) Assignee: MTU CFC Solutions GmbH, Ottobrunn (DE)

( * ) Notice: Subject to any disclaimer, the term of this patent is extended or adjusted under 35 U.S.C. 154(b) by 852 days.

(21) Appl. No.: 10/512,537

(22) PCT Filed: Apr. 23, 2003

(86) PCT No.: PCT/EP03/04194

§ 371 (c)(1), (2), (4) Date: Oct. 22, 2004

(87) PCT Pub. No.: WO03/094264

PCT Pub. Date: Nov. 13, 2003

(65) Prior Publication Data

US 2005/0130015 A1 Jun. 16, 2005

(30) Foreign Application Priority Data

Apr. 30, 2002 (DE) ................................ 102 19 456

(51) Int. Cl.
*H01M 8/02* (2006.01)
*H01M 2/14* (2006.01)

(52) U.S. Cl. ............................. 429/39; 429/35; 429/38

(58) Field of Classification Search ....................... None
See application file for complete search history.

(56) References Cited

U.S. PATENT DOCUMENTS

2004/0043280 A1 * 3/2004 Steinfort et al. ............... 429/38

FOREIGN PATENT DOCUMENTS

| | | |
|---|---|---|
| EP | 0 674 352 A2 | 9/1995 |
| JP | 61203573 | 9/1986 |
| WO | WO 02/41435 A2 | 5/2002 |

* cited by examiner

*Primary Examiner*—John S Maples
(74) *Attorney, Agent, or Firm*—Lucas & Mercanti, LLP; Klaus P. Stoffel

(57) ABSTRACT

A fuel cell, in particular a molten carbonate fuel cell and a method for production thereof are disclosed. The anode (1) and the cathode (2) are each provided on current collectors (4*a*, 4*b*), which electrically contact with the relevant electrode (1, 2) and form gas flow paths (17, 18) for a fuel gas or a cathode gas, whereby the anode-side current collector (4*a*) together with the anode (1) and the cathode-side current collector (4*b*) together with the cathode (2) form an anode half cell (11) and a cathode half cell (12) respectively. According to the invention, the electrolyte matrix (3) or electrolyte layer is applied to one of the half cells (11, 12) and sealing elements (21, 22) are provided on the sides of the current collectors (4*a*, 4*b*) laterally surrounding the above in a sealing manner, whereby an insulating layer (31) electrically insulates each sealing element (21, 22) of a half cell (11) with respect to the other half cell (12).

19 Claims, 4 Drawing Sheets

10

21
4a
1
2
4b
22
12
3
11

MOLTEN CARBONATE FUEL CELL AND METHOD FOR PRODUCTION THEREOF

PRIORITY CLAIM

This is a U.S. national stage of application No. PCT/EP2003/004194, filed on Apr. 23, 2003. Priority is claimed on that application and on the following application:

Country: Germany, Application No. 102 19 456.4, Filed: Apr. 30, 2002.

BACKGROUND OF THE INVENTION

The invention concerns a fuel cell, especially a molten electrolyte fuel cell, with an anode, a cathode, and an electrolyte matrix or layer of electrolyte arranged between them, as well as with current collectors installed at the anode and at the cathode, which electrically contact the anode and the cathode and form flow channels for a fuel gas and a cathode gas to the anode and the cathode. The current collector on the anode side, together with the anode, forms an anode half-cell, and/or the current collector on the cathode side, together with the cathode, forms a cathode half-cell.

In the typical fuel cells of today, especially molten carbonate fuel cells, the electrolyte matrix is integrated as a separate component in the fuel cell or in each of the several fuel cells that are combined into a fuel cell stack. With the usual thicknesses and dimensions of the electrolyte matrix of an efficient fuel cell, namely, a thickness of less than 1 mm, typically 0.5 to 0.6 mm, and a surface area of typically 1 $m^2$, the manual handling of the electrolyte matrix is critical due to its sensitivity to perforation and tearing. Especially during the assembly of large units of cell stacks, there is the danger that a lack of the necessary care and precision will render the fuel cell stack defective or inoperative.

SUMMARY OF THE INVENTION

The objective of the invention is to specify a fuel cell and a method for producing it, in which the risk of damaging the electrolyte matrix or layer of electrolyte is reduced or eliminated.

The invention creates a fuel cell, especially a molten carbonate fuel cell, with an anode, a cathode, and an electrolyte matrix or layer of electrolyte arranged between them, as well as with current collectors installed at the anode and at the cathode, which electrically contact the anode and the cathode and form gas flow channels for a fuel gas and a cathode gas to the anode and the cathode. The current collector on the anode side, together with the anode, forms an anode half-cell, and/or the current collector on the cathode side, together with the cathode, forms a cathode half-cell. The invention provides that the electrolyte matrix or layer of electrolyte is applied on one of the half-cells and that sealing elements are provided, which are mounted on the sides of the current collectors and form a U-shaped cross section that is open towards the inside of the fuel cell, and which laterally encompass and seal the current collector of the anode or cathode, such that an insulating layer is provided, which electrically insulates the given sealing element of one half-cell from the other half-cell.

In a preferred embodiment of the invention, the electrolyte matrix is applied on the anode half-cell.

In another preferred embodiment, the electrolyte matrix or layer of electrolyte is applied on the cathode half-cell.

In accordance with one embodiment, the sealing elements can be provided opposite each other on the anode half-cell and the cathode half-cell.

In accordance with another embodiment, the sealing elements can each be provided on one side of the anode half-cell and on one side of the cathode half-cell, such that the sealing element of the, anode half-cell is provided on one side, and the sealing element of the cathode half-cell is provided on the other side.

The insulating layer is preferably provided on the sealing element.

Alternatively, the insulating layer can be provided on one half-cell opposite the sealing element of the other half-cell.

In accordance with one embodiment, the sealing element has an insulating layer on the inside and/or the outside.

In a preferred embodiment of the fuel cell of the invention, the current collector is formed by a porous structure, which supports the anode or the cathode and in which flow channels are formed for supplying fuel gas and cathode gas to the anode and cathode, respectively, and the sealing elements laterally encompass and seal the porous structure that forms the current collector and the anode or cathode located on it.

The height of the sealing element, including, if present, the insulating layer, is equal to the thickness of the half-cell, so that the surfaces of the two are flush with each other.

The porous structure that forms the current collectors can consist of a sintered material, preferably a porous nickel sintered material.

In particular, the porous structure that forms the current collectors can consist of a nickel foam material with a solids content of 4% to about 35%.

The insulating layer can consist of a layer of matrix material.

Alternatively, the insulating layer can consist of an insulating material that is different from the matrix material.

In another embodiment of the fuel cell of the invention, the matrix is applied on the half-cell, including the sealing elements, and simultaneously serves as the insulating layer.

In the method of the invention for producing a fuel cell of the type described above, the electrolyte matrix is applied by producing a coating on the half-cell.

The coating is preferably produced by spraying, pouring, dipping, or spreading with the use of a doctor blade.

The sealing elements are preferably mounted laterally on the half-cells.

In accordance with preferred embodiments of the method of the invention, the surface of the sealing element, including, if present, the insulating layer, is made flush with the surface of the half-cell by rolling, stamping, or pressing.

In accordance with an alternative embodiment of the method of the invention, before the sealing elements are mounted, a shoulder is produced on the half-cells by rolling, stamping, or pressing, so that the sealing elements, including, if present, the insulating layer, are flush with the surface of the half-cell.

In accordance with preferred embodiments of the method of the invention, the insulating layer is produced by spraying, pouring, dipping, or spreading with the use of a doctor blade.

In accordance with an alternative embodiment of the method of the invention, the sealing elements are first mounted, and then the matrix, which simultaneously serves as the insulating layer, is applied to the half-cell.

BRIEF DESCRIPTION OF THE DRAWINGS

Embodiments of the invention are explained below with reference to the drawings.

FIGS. (1*a*) and (1*b*) show schematic perspective sectional views of a fuel cell to illustrate their basic design and a first embodiment of the invention.

FIGS. (2*a*), (2*b*), and (2*c*) show schematic perspective sectional views of fuel cells in accordance with a second, a third, and a fourth embodiment of the invention.

Figure 1A:
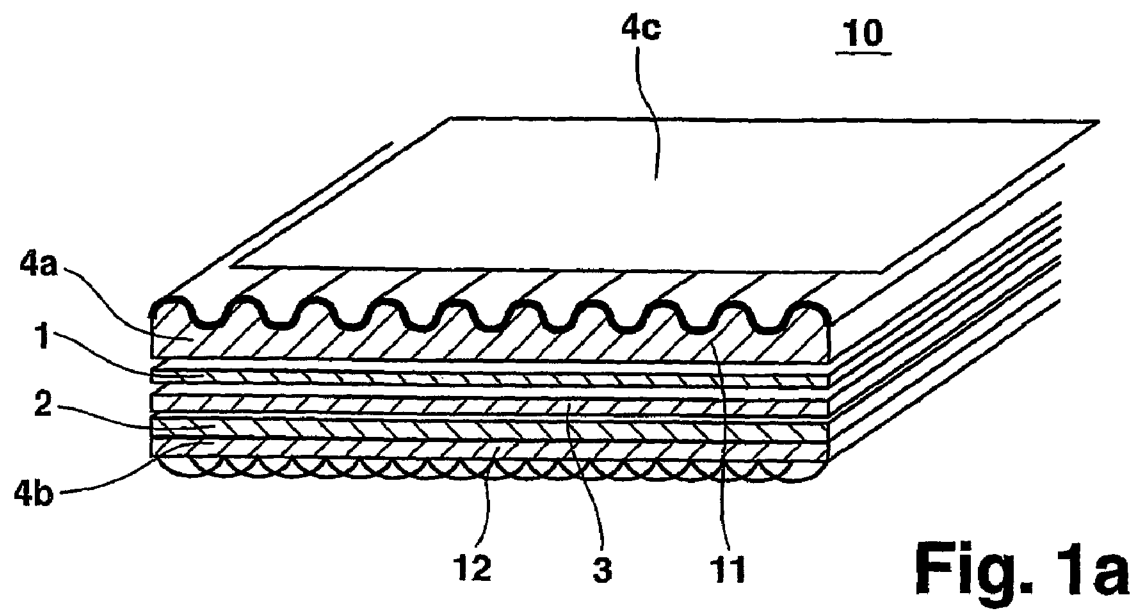
Figure 1B:
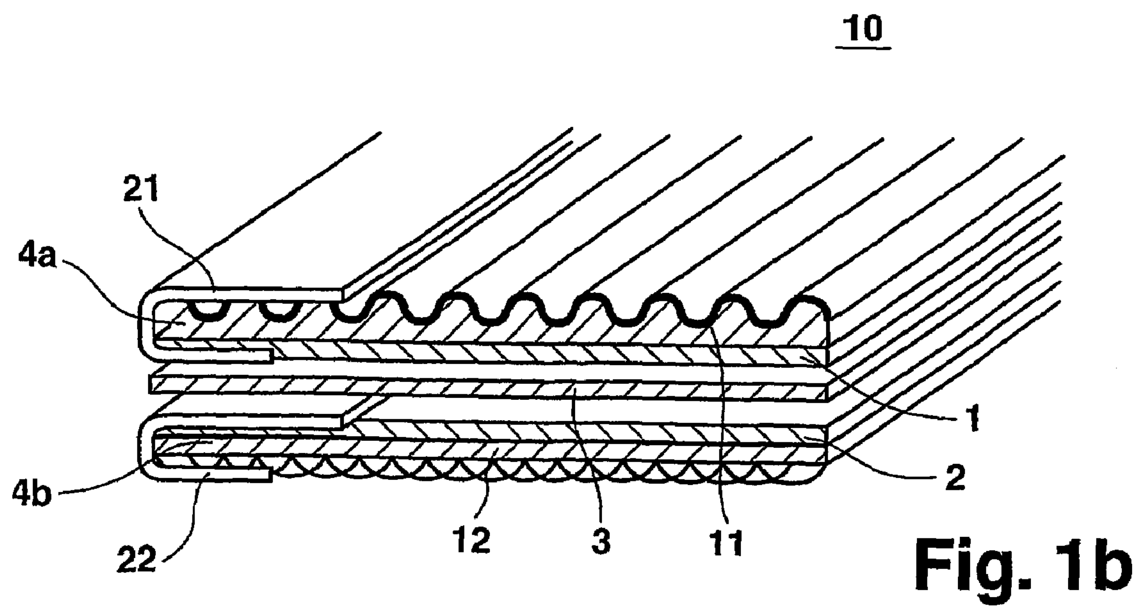
Figure 2A:
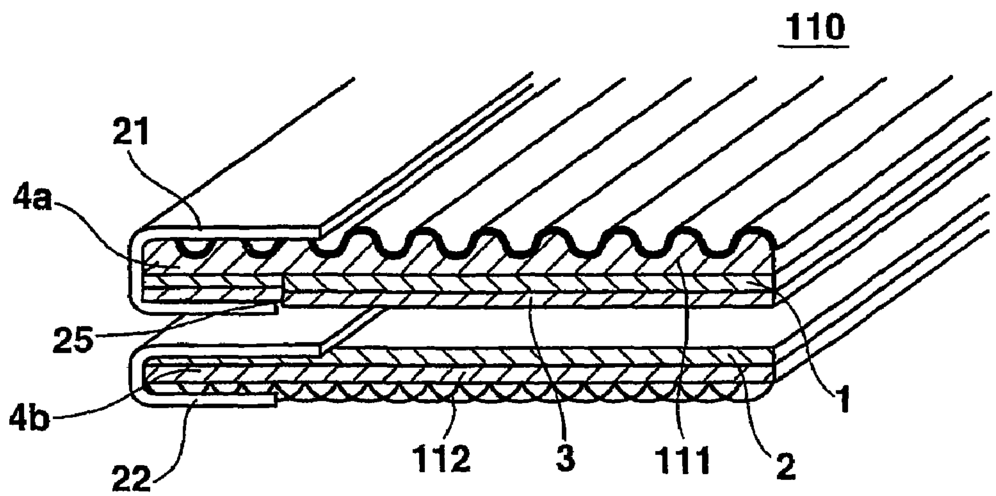
Figure 2B:
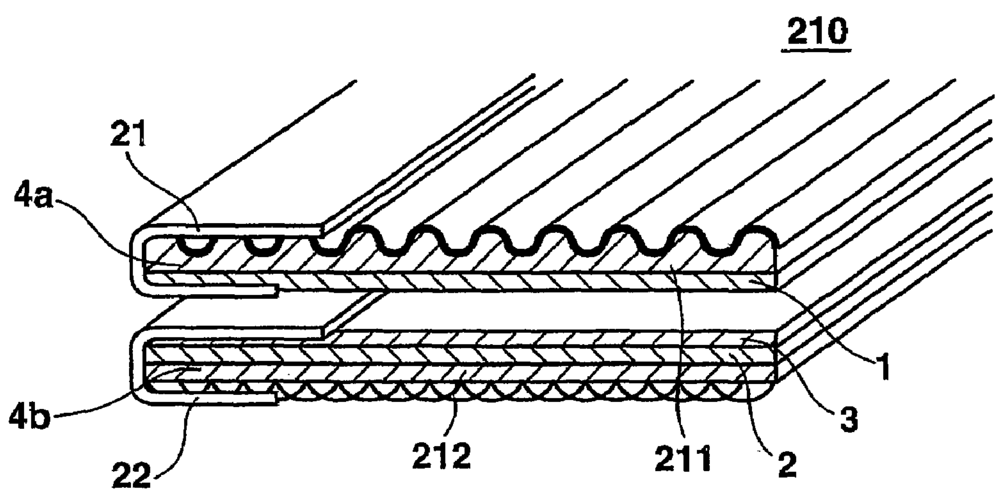
Figure 2C:
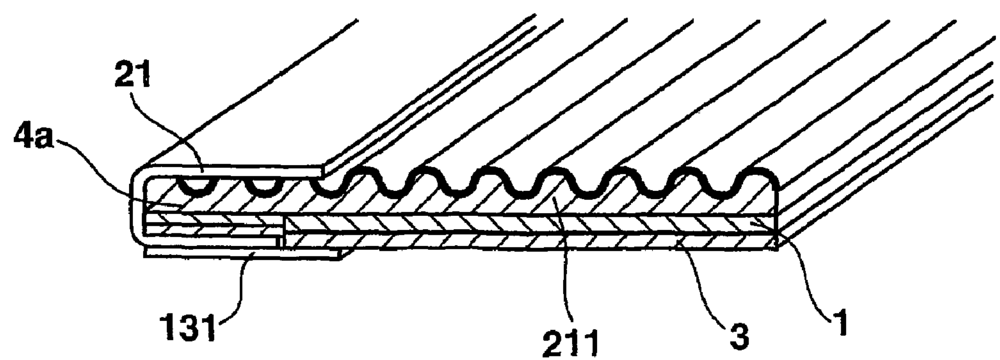

FIGS. (3*a*) and (3*b*) show schematic perspective sectional views of fuel cells to illustrate various types of insulation of sealing elements in the embodiments shown in FIG. 2.

Figure 4:
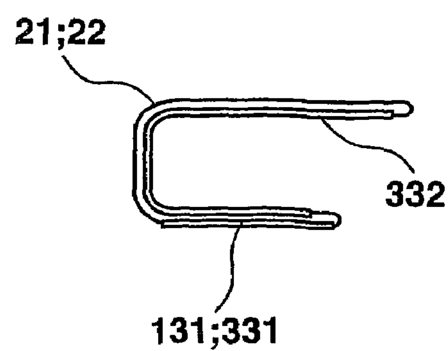

FIG. 4 shows an enlarged schematic cross-sectional view of a sealing element in accordance with one embodiment of the invention.

Figure 5:
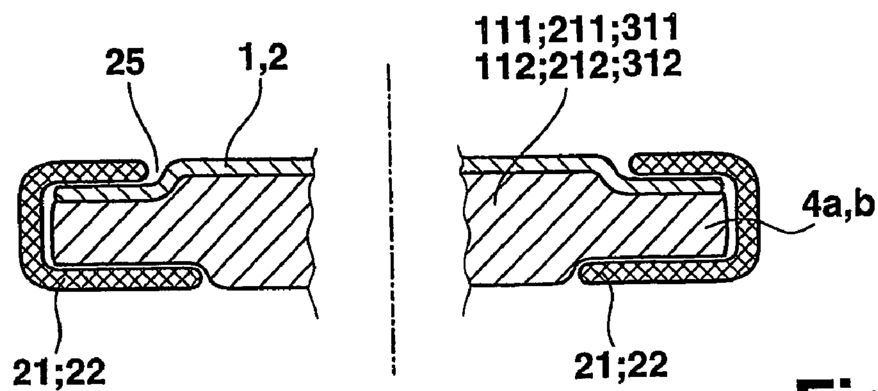

FIG. 5 shows an enlarged schematic sectional view of a fuel half-cell with a current collector formed by a porous structure and an electrode supported by it, together with a sealing element for lateral sealing of the half-cell, in accordance with one embodiment of the invention.

Figure 6:
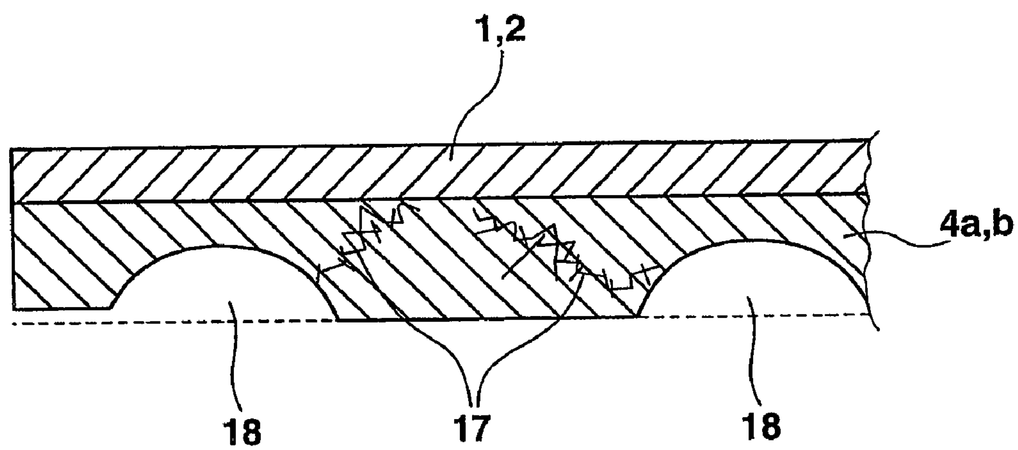

FIG. 6 shows an enlarged schematic cross-sectional view of a segment of a porous structure that forms a current collector, with an electrode applied on it, in accordance with one embodiment of the invention.

Figure 7:
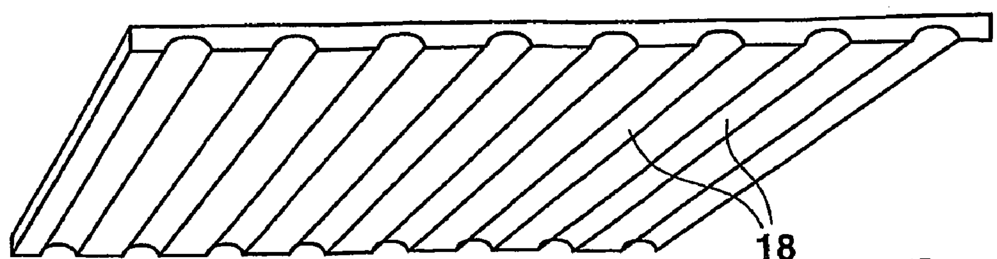

FIG. 7 shows a perspective view on a somewhat smaller scale of the porous structure that forms the current collector in FIG. 6.

DETAILED DESCRIPTION OF THE INVENTION

FIG. (1*a*) shows a schematic perspective sectional view of a fuel cell, which is labeled as a whole by reference number 10. A relatively large number of such fuel cells 10 are typically combined into a fuel cell stack, as is well known in the state of the art. The fuel cell 10 contains an anode 1, a cathode 2, and an electrolyte matrix 3 arranged between them. In the case of the molten carbonate fuel cell shown in the drawings, the electrolyte matrix consists of a porous material whose pores contain the molten electrolyte during operation. In the case of a solid oxide fuel cell, which is also encompassed by the invention, an oxide ceramic electrolyte layer is provided instead of an electrolyte matrix. The term "electrolyte matrix" used below is also synonymous for an electrolyte layer of other types of fuel cells. Bipolar plates 4*c* are arranged between adjacent fuel cells 10 of the aforementioned fuel cell stack. They separate the adjacent fuel cells 10 with respect to gas flow but allow electrical contact between them. A current collector 4*a* or 4*b* is provided between each of the bipolar plates 4*c*, only one of which is shown in FIG. (1*a*), and the anode 1 or cathode 2. On the one hand, the current collector electrically contacts the given electrode, i.e., the anode 1 or the cathode 2, with the bipolar plate 4*c* and thus with the adjacent fuel cell and, on the other hand, serves to supply the flows of a fuel gas and a cathode gas to the anode 1 and the cathode 2, respectively, by which means these gases are distributed. The anode 1, together with the current collector 4*a*, forms an anode half-cell 11, and the cathode 2, together with the current collector 4*b*, forms a cathode half-cell 12.

In accordance with a first embodiment of the invention, as shown in FIG. (1*b*), sealing elements 21, 22 are provided on the sides of each current collector 4*a*, 4*b*. They form a U-shaped cross section that is open towards the inside of the fuel cell and laterally encompass and seal the current collector 4*a*, 4*b* of the anode 1 and cathode 2, respectively, and the anode half-cell 11 formed by the current collector 4*a*and the anode 1, and the cathode half-cell 12 formed by the current collector 4*b* and the cathode 2. The electrolyte matrix 3 extends between the sealing elements 21, 22 and forms an insulating layer, which electrically insulates the sealing element 21 of one of the half-cells 11 from the other half-cell 12 and from the sealing element 22 of the other half-cell 12.

As is illustrated by the embodiment shown in FIG. (2*a*), the electrolyte matrix 3 can be applied on the anode half-cell 111, i.e., on the anode 1, which in turn is mounted on the current collector 4*a* on the anode side. Here again, each of the two half-cells, the anode half-cell 111 and the cathode half-cell 112, is laterally encompassed and sealed by a sealing element 21 and 22, respectively.

In the embodiment shown in FIG. (2*b*), the electrolyte matrix 3 is applied on the cathode half-cell 212, i.e., on the cathode 2, which in turn is supported by the current collector 4*b* on the cathode side. The half-cells 211 and 212 are again laterally encompassed and sealed by sealing elements 21 and 22, respectively.

In both the embodiment shown in FIG. (2*a*) and the embodiment shown in FIG. (2*b*), the electrolyte matrix 3 is also encompassed by the respective sealing element 21 or 22, so that in these embodiments the electrolyte matrix 3 does not have an insulating function involving electrical separation of the sealing elements 21, 22. To prevent electrical contact between the sealing elements 21, 22, in other words, a short circuit, an insulating layer 131 is provided (see FIG. (2*c*)), which electrically insulates the sealing element 21 or 22 of one half-cell 111 or 211 from the other half-cell.

As shown in FIG. (2*c*), this insulating layer 131 can be provided on the sealing element 21 of the half-cell, here half-cell 111, that supports the electrolyte matrix 3, or it can also be provided on the sealing element of the opposite half-cell. In both cases, the sealing elements 21, 22 are electrically insulated from each other and from the opposite half-cell. The insulating layer 131 can consist of a layer of matrix material or of an insulating material that is different from the matrix material.

FIGS. (3*a*) and (3*b*) show embodiments in which the sealing elements 21, 22 are each provided on one side of the anode half-cell 311 and on one side of the cathode half-cell 312, such that the sealing element 21 of the anode half-cell 311 is provided on one side, and the sealing element 22 of the cathode half-cell 312 is provided on the other side. In these embodiments, the electrolyte matrix 3 is provided on the cathode half-cell 312, i.e., it is applied on the cathode 2, which in turn is supported by the current collector 4*b*. Accordingly, in the embodiment shown in FIG. (3*a*), the sealing element 21 of the anode half-cell 311 is arranged opposite the electrolyte matrix 3 provided on the cathode half-cell 312 and is thus electrically insulated from the cathode half-cell 312 by the electrolyte matrix 3, whereas the sealing element 22 of the cathode half-cell 312, which also encompasses the electrolyte matrix 3 applied on the cathode half-cell 312, is arranged opposite the anode 1 of the anode half-cell 311, so that electrical contact exists between these two unless measures for electrical insulation are provided. Therefore, as shown in FIG. (3*b*), an electrically insulating layer 331 is provided, which insulates the sealing element 22 of the cathode half-cell 312 from the anode half-cell 311. In the embodiment shown in FIG. (3*b*), this electrically insulating layer 331 is provided on the anode 1 of the anode half-cell 311. Alternatively, analogously to the situation shown in FIG. (2*c*), the electrically insulating layer 331 can be provided on the sealing element 22 that encompasses the cathode half-cell 312. The effect of electrical insulation is the same in both cases. The electrically insulating layer 331 can again consist of a layer of matrix material or of an insulating material that is different from the matrix material.

As the enlarged cross-sectional view in FIG. 4 shows, the electrically insulating layer 131; 331 can be provided on the outside of the sealing element 21 or 22. Alternatively or additionally, an insulating layer 332 can be provided on the inside of the sealing element 21 or 22. In both cases, the insulating layers 131; 331 and/or 332 electrically insulate the half-cells from each other.

As is illustrated in the enlarged schematic cross-sectional view in FIG. 5, which shows a half-cell 111; 211; 311 or 112; 212; 312 formed by an electrode 1 or 2 and a current collector 4*a* or 4*b*, the half-cell is laterally encompassed and sealed by the sealing element 21, 22. The height of the sealing element 21 or 22, including, if present, an insulating layer, which, however, is not shown in FIG. 5, is equal to the thickness of the half-cell 111; 211; 311 or 112; 212; 312, so that the surfaces of the two are flush with each other. For this purpose, a shoulder 25 equal to the material thickness of the sealing element 21 or 22 and, if present, the insulating layer, is formed on the half-cell, so that the respective surfaces are flush continuations of each other.

As is also indicated in FIG. 5, the current collector 4*a*, 4*b* is formed by a porous structure, which supports the anode 1 or cathode 2, respectively, together with which it forms the respective anode or cathode half-cell. The porous structure of the current collectors 4*a*, 4*b* can consist of a sintered material, especially a porous nickel sintered material, which in the embodiment described here is a nickel foam material with a solids content of 4% to about 35%. The surface of the porous structure 4*a*, 4*b* that supports the anode 1 and the cathode 2 is formed as a flat surface, and the anode 1 and the cathode 2 are provided in the form of a layer on the porous structure that constitutes the current collectors 4*a*, 4*b*.

FIG. 6, which shows an enlarged cross-sectional view of a porous structure that forms the current collector 4*a*, 4*b*, with an electrode 1, 2 applied on it, shows flow channels for conveying fuel gas or cathode gas in the form of (microscopic) flow channels 17, which are present within the porous structure due to its porosity, and (macroscopic) gas channels 18, which are created in or on the porous structure. In the illustrated embodiment, channels 18 of this type are provided in the form of grooves on the surface of the porous structure constituting the current collectors 4*a*, 4*b* that faces away from the given electrode 1, 2.

FIG. 7 shows a perspective view of a current collector 4*a*, 4*b* of this type, showing the course of the (macroscopic) channels 18 on the surface of the porous structure. This course of the channels is intended only as an illustrative example; naturally, the channels can be realized in any other suitable form.

The electrolyte matrix 3 can be applied and provided by producing a coating on the given half-cell 11; 111; 311 or 12; 212; 312, i.e., on both the anode half-cell and the cathode half-cell.

The coating can be produced by spraying, pouring, dipping, spreading with the use of a doctor blade, or by some other suitable coating method.

The sealing elements 21, 22 can be laterally mounted on the half-cells 11; 111; 211; 311 and 12; 112; 212; 312.

The surface of the sealing elements 21; 22, including, if present, the insulating layer 131; 331, can be made flush with the surface of the half-cell 111; 211; 311; 112; 212; 312 by rolling, stamping, or pressing. Alternatively, before the sealing elements 21; 22 are mounted, a shoulder 25 can be produced on the half-cells 11; 111; 211; 311 and 12; 112; 212; 312 by rolling, stamping, or pressing, so that the sealing elements 21, 22, including, if present, the insulating layer 131; 331, are flush with the surface of the half-cell.

Figure 3A:
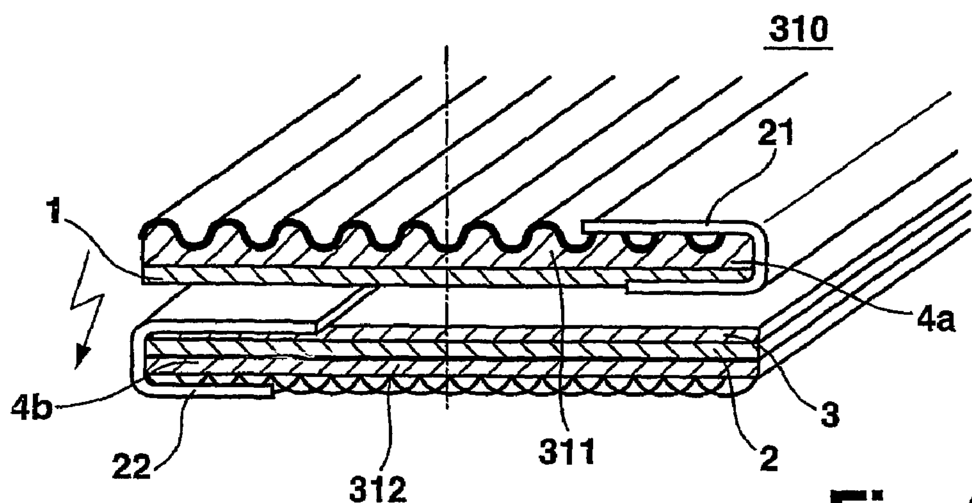
Figure 3B:
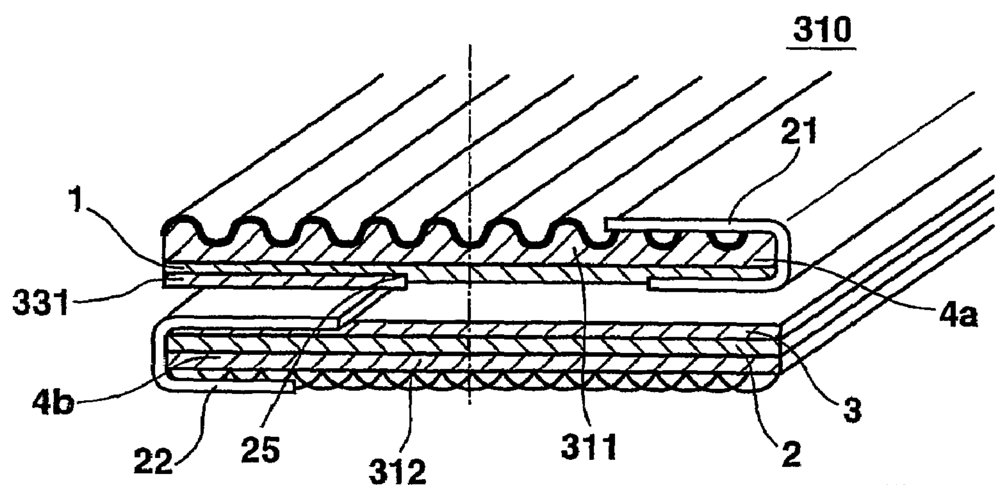

Likewise, an insulating layer 331 applied directly to a half-cell 311 (see FIG. 3*b*)) can be made flush with the surface of the half-cell 311 by rolling, stamping, or pressing, or, alternatively, before the application of the insulating layer 331, a suitable shoulder can be produced on the half-cell 311, likewise by rolling, stamping, or pressing, so that the insulating layer 331 is flush with the surface of the half-cell 311.

The insulating layer 131; 331 and/or 332 can be produced by spraying, pouring, dipping, or spreading with the use of a doctor blade.

In accordance with an alternative method, the sealing elements 21, 22 can first be mounted laterally on the half-cells 11 and 12, and then the matrix 3 can be applied to one of the half-cells, which then simultaneously acts as the insulating layer 31 between one of the sealing elements 21 or 22 and the opposite half-cell 12 or 11 or the opposite sealing element 22 or 21 (see FIG. (1*b*)).

The invention claimed is:

1. A fuel cell, comprising:

an anode;

a cathode;

an electrolyte matrix or layer of electrolyte arranged between the anode and the cathode;

a current collector installed at the anode and a current collector installed at the cathode so as to electrically contact the anode and the cathode and form gas flow channels for a fuel gas to the anode and a cathode gas to the cathode, the current collector on the anode side, together with the anode, form an anode half-cell, and the current collector on the cathode side, together with the cathode, form a cathode half-cell, the electrolyte matrix or layer of electrolyte being applied on one of the half cells; and a sealing element mounted on sides of the current collector on the anode side and a sealing element mounted on sides of the current collector on the cathode side, each of the sealing elements having a U-shaped cross section that opens toward an inside of the fuel cell so that the sealing elements laterally encompass and seal the current collector of the anode or cathode, an insulating layer being provided, which electrically insulates the sealing element of one of the half-cells from the other of the half-cells.

2. The fuel cell in accordance with claim 1, wherein the electrolyte matrix or layer of electrolyte is applied on the anode half-cell.

3. The fuel cell in accordance with claim 1, wherein the electrolyte matrix or layer of electrolyte is applied to the cathode half-cell.

4. The fuel cell in accordance with claim 1, wherein each of the sealing elements is provided opposite the other sealing element on the anode half-cell and the cathode half-cell.

5. The fuel cell in accordance with claim 1, wherein each of the sealing elements is provided on one side of the anode half-cell and the cathode half-cell, such that the sealing element of the anode half-cell is provided on one side, and the sealing element of the cathode half-cell is provided on an opposite side.

6. The fuel cell in accordance with claim 1, wherein the insulating layer is provided on the sealing element.

7. The fuel cell in accordance with the claim 1, wherein the insulating layer is provided on one half-cell opposite the sealing element of the other half-cell.

8. The fuel cell in accordance with claim 1, wherein at least one of the sealing elements has an insulating layer on the inside and/or the outside.

9. The fuel cell in accordance with claim 1, wherein the current collectors are formed by a porous structure, which supports the anode or the cathode and in which the flow channels are formed for supplying fuel gas and cathode gas to the anode and the cathode, respectively, the sealing elements laterally encompass and seal the porous structure that forms the current collectors or the porous structure that forms the current collectors and, if present, the anode or cathode located on it.

10. The fuel cell in accordance with claim 9, wherein the sealing element has a height equal to a thickness of the half-cell so that surfaces of the sealing element and the half-cell are flush with each other.

11. The fuel cell in accordance with claim 9, wherein the insulating layer is provided on the sealing element, the sealing element, including the insulating layer, having a height equal to a thickness of the half-cell so that surfaces of the sealing element and the half-cell are flush with each other.

12. The fuel cell in accordance with claim 9, wherein the sealing element has an insulating layer on the inside and/or the outside, the sealing element, including the insulating layer, having a height equal to a thickness of the half-cell so that surfaces of the sealing element and the half-cell are flush with each other.

13. The fuel cell in accordance with claim 9, wherein the porous structure that forms the current collector consists of a sintered material.

14. The fuel cell in accordance with claim 13, wherein the sintered material is a porous nickel sintered material.

15. The fuel cell in accordance with claim 13, wherein the porous structure that forms the current collectors consists of a nickel foam material with solids content of 4% to about 35%.

16. The fuel cell in accordance with claim 1, wherein the insulating layer consists of a layer of matrix material.

17. The fuel cell in accordance with claim 1, wherein the insulating layer consists of an insulating material that is different from the matrix material.

18. The fuel cell in accordance with claim 1, wherein the matrix is applied on the half-cell, including the sealing elements and simultaneously serves as the insulating layer.

19. The fuel cell in accordance with claim 1, wherein the fuel cell is a molten carbonate fuel cell.

* * * * *